United States Patent [19]
Hampo et al.

[11] Patent Number: 5,747,689
[45] Date of Patent: May 5, 1998

[54] FLUID LEVEL SENSING SYSTEM

[75] Inventors: Richard Joseph Hampo, Livonia; Paul Theodore Momcilovich, Carleton; Ross Maxwell Stuntz, Birmingham, all of Mich.

[73] Assignee: Ford Global Technologies, Inc., Dearborn, Mich.

[21] Appl. No.: 762,083

[22] Filed: Dec. 9, 1996

[51] Int. Cl.$^6$ ........................................ G01F 1/56
[52] U.S. Cl. ...................... 73/304 C; 73/292; 364/509
[58] Field of Search .................... 73/304 C, 304 R, 73/292; 364/509

[56] References Cited

U.S. PATENT DOCUMENTS

| | | | |
|---|---|---|---|
| 3,343,415 | 9/1967 | Johnston | 73/304 C |
| 3,935,739 | 2/1976 | Ells | 73/304 C |
| 4,099,167 | 7/1978 | Pomerantz et al. | 73/304 C |
| 4,553,434 | 11/1985 | Spaargaren | 73/304 C |
| 4,594,893 | 6/1986 | Lombard et al. | 73/304 C |
| 4,611,489 | 9/1986 | Spaargaren et al. | 73/304 C |
| 4,676,101 | 6/1987 | Baughman | 73/304 C |
| 5,031,453 | 7/1991 | Kline | 73/304 C |
| 5,052,223 | 10/1991 | Regnault et al. | 73/304 C |
| 5,103,368 | 4/1992 | Hart | 73/304 C |
| 5,142,909 | 9/1992 | Baughman | 73/304 C |
| 5,146,783 | 9/1992 | Jansche et al. | 73/301 |
| 5,399,979 | 3/1995 | Henderson et al. | 73/304 C |
| 5,406,843 | 4/1995 | Hannan et al. | 73/304 C |
| 5,423,214 | 6/1995 | Lee | 73/304 C |
| 5,437,184 | 8/1995 | Shillady | 73/304 C |
| 5,613,399 | 3/1997 | Hannan et al. | 73/304 C |

OTHER PUBLICATIONS

SAE Paper 930359 entitled "High Accuracy Capacitance Type Fuel Sensing System" by T. Shiratsuchi, M. Imaizumi and M. Naito; pp. 111-117.

SAE Paper 940628 entitled "A Universal and Cost-Effective Fuel Gauge Sensor Based on Wave Propagation Effects in Solid Metal Rods" by Zabler et al; pp. 29-40.

"A Fuel Tank Level Sensor with Digital Output" by Richard H. Brown, Sensors, Apr. 1994, pp. 41-42.

*Primary Examiner*—Hezron E. Williams
*Assistant Examiner*—Rose M. Miller
*Attorney, Agent, or Firm*—Mark S. Sparschu

[57] ABSTRACT

In one embodiment of the present invention, a method for measuring fluid level use a sensor comprising a first plate having continuous electrically conductive material and a second plate having electrically conductive material disposed in segments, the electrically conductive material of the first plate in opposition to the electrically conductive material of the second plate. The method comprises immersing the sensor in the fluid with at least one segment completely immersed in the fluid and at least one said segment completely out of the fluid. The method also includes sequentially energizing the segments. Further, the method includes detecting times of voltage transitions of a first signal at the first plate, relative to the sequential energizing of the segments, as an indication of fluid level.

14 Claims, 4 Drawing Sheets

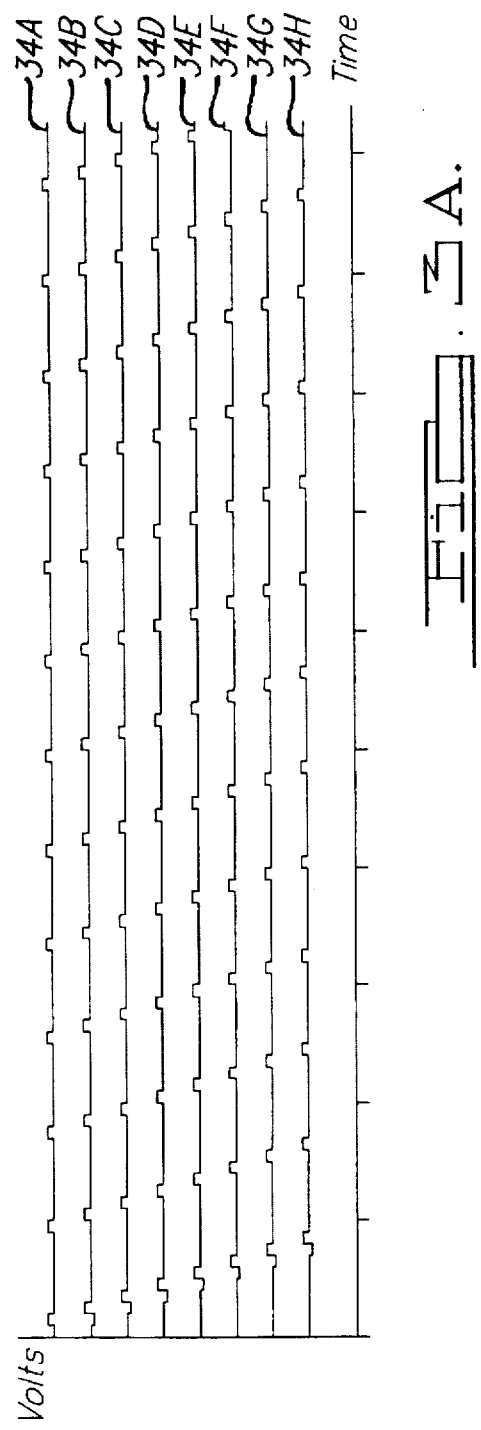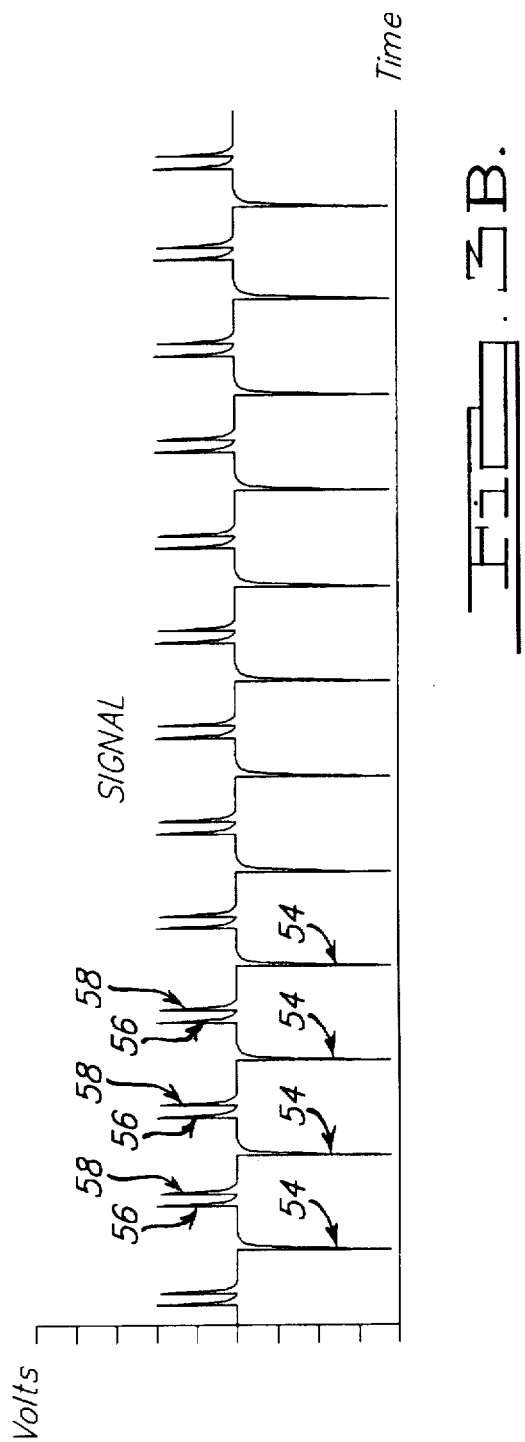

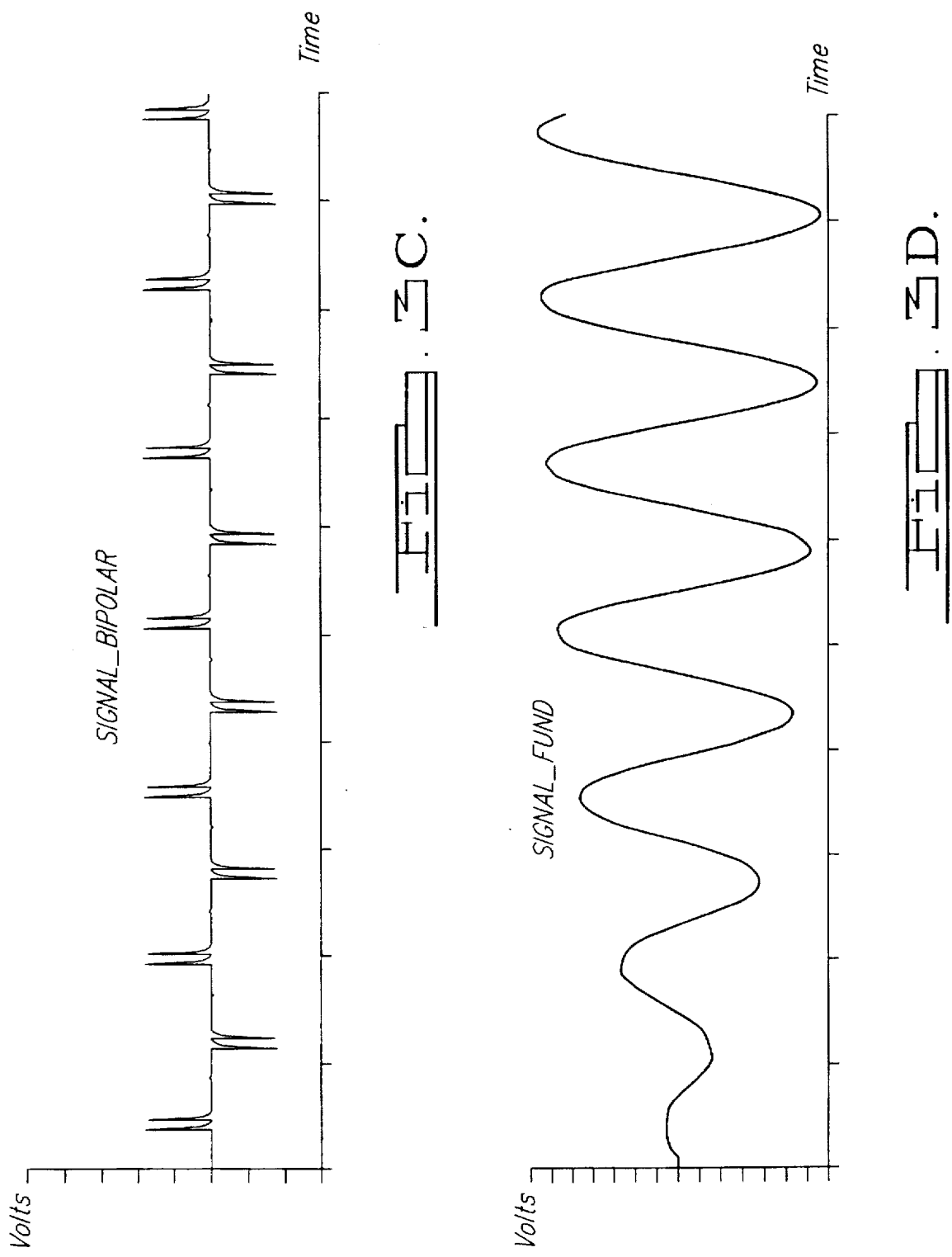

FLUID LEVEL SENSING SYSTEM

BACKGROUND OF THE INVENTION

1. Field of the Invention

The present relates to systems for measuring a level of fluid in a reservoir.

2. Description of the Related Art

In sensing the level of fluid in a reservoir, capacitive fluid level sensors are known. One general type of capacitive fluid level sensor uses two parallel plates partially immersed in the fluid whose level is to be measured. With this type of sensor, the absolute capacitance of the sensor is measured. Because the capacitance of the sensor is a function of the level of fluid between the plates, the level of the fluid can be ascertained.

A shortcoming of such a capacitive fluid level sensor is that the capacitance of the sensor is very dependent upon the composition of the fluid being measured. Thus, if the fluid is of unknown composition, such as gasoline with an unknown proportion of water or alcohol, the accuracy of the sensor will be degraded. Some methods for improving the accuracy of the sensor, such as those disclosed in U.S. Pat. No. 4,676,101, issued to Baughman and U.S. Pat. No. 4,594,893, issued to Lombard et al. may be generally effective. However, the methods also add to the system's cost and complexity.

A second general type of capacitive fluid level sensor employs one or two plates, each plate comprised of a series of conductive segments. Such sensors are employed, for example, in systems disclosed in U.S. Pat. No. 5,437,184, issued to Shillady and U.S. Pat. No. 5,399,979, issued to Henderson et al. The resolution of these sensors, however, each depend upon the number of segments into which the plate or plates are divided. Providing a high resolution sensor, therefore, would involve providing a large number of segments and associated electrical interconnections. This will have a negative effect upon the cost and reliability of the system. Further, while Henderson et al. attempts to interpolate within a segment, that interpolation assumes an exact knowledge of the dielectric constant of the fluid whose level is being sensed. As discussed above, this is a limitation.

Therefore, a capacitive fluid level sensing system which is substantially unaffected by the dielectric constant of the fluid whose level is being measured and whose resolution is largely independent of the number of capacitive segments used can provide advantages over the prior art.

SUMMARY OF THE INVENTION

The present invention provides a method for measuring fluid level. The method uses a sensor comprising a first plate having continuous electrically conductive material and a second plate having electrically conductive material disposed in segments, the electrically conductive material of said first plate in opposition to the electrically conductive material of the second plate. The method comprises immersing the sensor in the fluid with at least one segment completely immersed in the fluid and at least one segment completely out of the fluid. The method further includes sequentially energizing the segments. In addition, the method comprises detecting times of voltage transitions of a first signal at the first plate, relative to the sequential energizing of the segments, as an indication of fluid level.

The present invention also provides a fluid level sensing system. The system comprises a sensor further comprising a first plate having continuous electrically conductive material and a second plate having electrically conductive material disposed in segments, the electrically conductive material of the first plate in opposition to the electrically conductive material of the second plate, the sensor immersed in the fluid with one segment completely immersed in the fluid and one segment completely out of the fluid. The sensor additionally comprises means for sequentially energizing the segments. Also, the sensor includes means for detecting times of voltage transitions of a first signal at the first plate, relative to the sequential energizing of the segments, as an indication of fluid level.

Fluid level sensing systems and methods according to the present invention can sense fluid level without knowing the precise composition of the fluid. Further, systems and methods according to the present invention can provide fluid level sensing resolution which is substantially independent of the number of segments used in the sensor. As a result, the present invention provides substantial advantages over prior art systems and methods.

BRIEF DESCRIPTION OF THE DRAWINGS

FIGS. 3A–3D show electrical signals measured at various of the steps along the flow diagram of FIG. 2.

DETAILED DESCRIPTION OF THE PREFERRED EMBODIMENT

Figure 1:
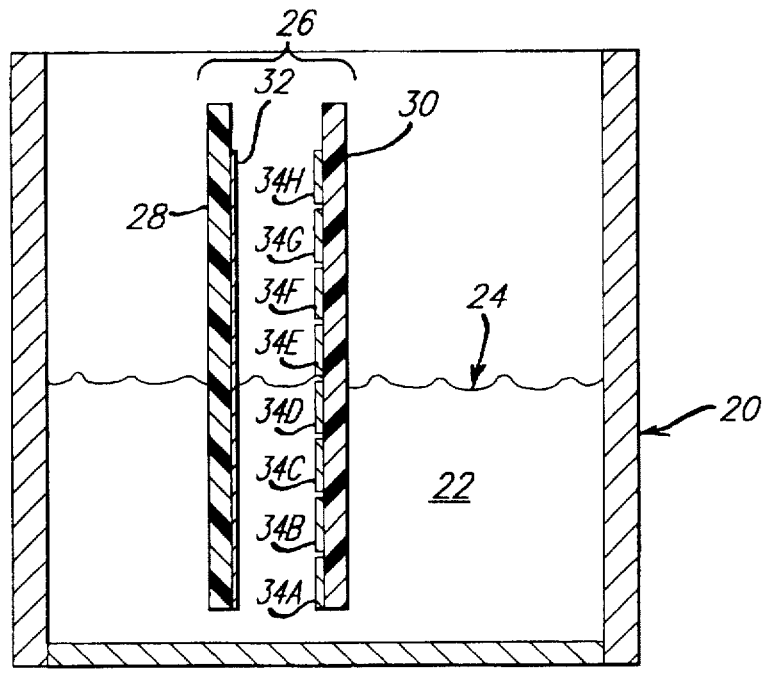
FIG. 1 is a side view of a fluid level sensor 26 according to one embodiment of the present invention.

Refer first to FIG. 1. Here, a reservoir 20 contains a fluid 22 whose level 24 is to be measured. A fluid level sensor 26 includes two parallel electrically-insulating plates 28 and 30, each of which is partially submerged in fluid 22. Provided on plate 30 is a continuous conductive layer 32, which will be referred to hereafter as a "common electrode" of sensor 26. Provided on plate 28 is a segmented conductive layer comprising segments 34A–34H. Sensor 26 is mounted by suitable mechanical means in fluid 22.

One can see by examining FIG. 1 that fluid level sensor 26 provides a series of capacitors along the axis of fluid level measurement. Each capacitor is formed by common electrode 32 and one of segments 34. Eight segments 34A–34H are used in this embodiment of the present invention, although the present invention is not so limited.

Figure 2:
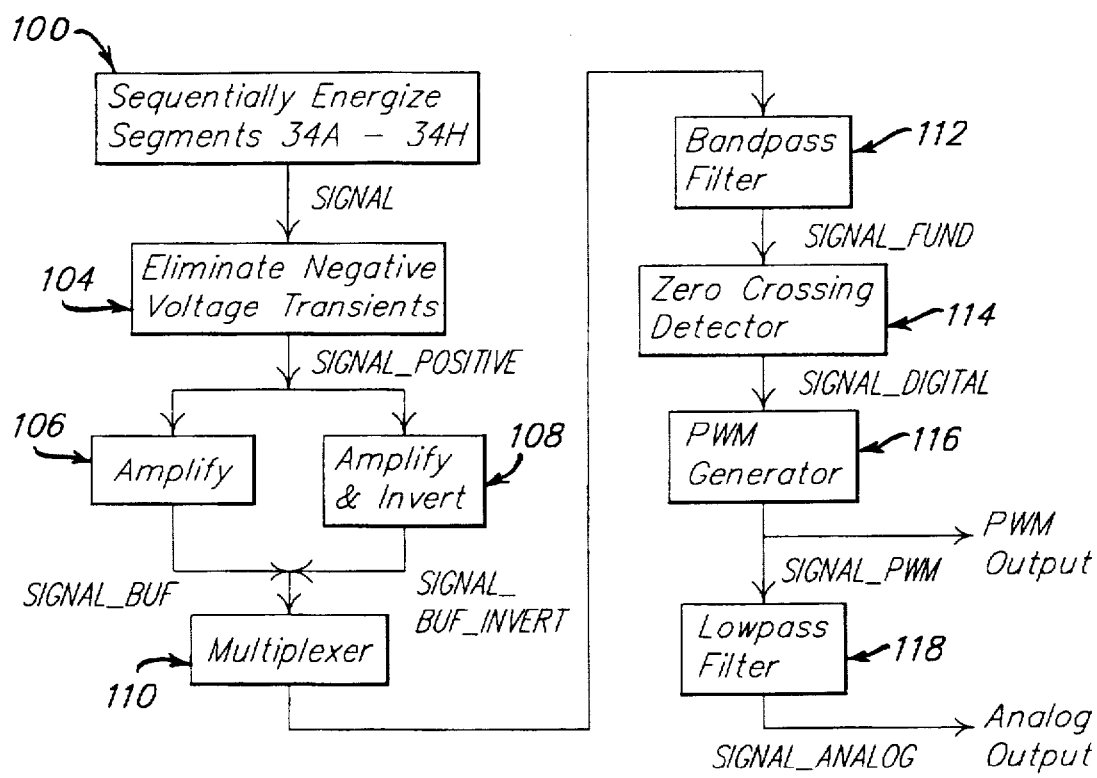
FIG. 2 is a flow diagram of a method for sensing fluid level using a sensor such as sensor 26 of FIG. 1.

Measurement of fluid level using sensor 26 is accomplished by the method illustrated in FIG. 2. At block 100, voltage pulses are applied sequentially to segments 34 of sensor 26, starting at segment 34A. Measured at common electrode 32, a voltage signal (which will hereinafter be called SIGNAL) can be measured. Refer additionally to FIGS. 3A and 3B for illustrations, respectively, of the sequence of voltage pulses applied to sensor 26 and the resulting SIGNAL at common electrode 32. In FIG. 3B, the recurring negative-going voltage spikes 54 are caused by the first voltage pulse (the pulse applied to segment 34A) charging the capacitor formed by common electrode 32 and segment 34A. This spike occurs at the first voltage pulse of each periodic application of the sequence of voltage pulses.

Once the capacitor formed by common electrode 32 and segment 34A is charged, the second voltage pulse in sequence is applied to segment 34B. Assuming that segment 34B is also completely immersed in fluid 22, the charge which had previously been stored via segment 34A is merely transferred to the capacitor formed by common electrode 32 and segment 34B. No net charge is transferred to or from sensor 26, so the voltage as measured at common electrode 32 remains zero.

The voltage at common electrode 32 remains zero until a segment 34 which is only partially submerged in fluid 26 is energized in sequence. The capacitance of the capacitor formed by that segment 34 and common electrode 32 will be less than the previous capacitors, because air has a lower dielectric constant than most liquids. Thus, some of the stored charge will leave sensor 26, causing a first positive-going voltage spike 56.

When the next segment 34 is then energized in sequence, its capacitance will be less yet than the previous capacitance. This is true because the present segment 34 will be completely above the level of liquid 22. Thus, fuel level sensor 26 will discharge further, causing a second positive-going voltage spike 58.

The timing of positive-going voltage spikes 56 and 58 relative to the sequence of pulses which energize sensor 26 (FIG. 3A) provides an indication of the level of fluid in reservoir 20.

Continuing with FIG. 2, one method of processing SIGNAL to extract the fluid level information will now be discussed. At block 104, the negative-going voltage spikes 54 are eliminated to generate a signal which will be referred to as SIGNAL_POSITIVE. SIGNAL_POSITIVE is then amplified as appropriate at block 106 and amplified as appropriate and inverted at block 108. Signals SIGNAL_BUF and SIGNAL_BUF_INVERT are thus generated. SIGNAL_BUF and SIGNAL_BUF_INVERT are then combined by a multiplexer at block 110. The resulting signal, SIGNAL_BIPOLAR is illustrated in FIG. 3C. SIGNAL_BIPOLAR is then bandpass filtered at block 112 to extract its fundamental frequency component, SIGNAL_FUND, which is illustrated in FIG. 3D. SIGNAL_FUND is a sinusoid having a phase angle which is indicative of the relative timing of positive-going voltage spikes 56 and 58 (FIG. 3B) with respect to the sequence of pulses (FIG. 3A) applied to sensor 26.

At block 114, this phase angle can be detected using a zero-crossing detector to generate a signal SIGNAL_DIGITAL, which can then be used to generate a pulse-width-modulated signal SIGNAL_PWM (block 116) having a duty cycle indicative of the phase angle of SIGNAL_FUND. SIGNAL_DIGITAL or SIGNAL_PWM can be used as an output to indicate fuel level. Also, SIGNAL_PWM can be low-pass filtered to generate an analog signal SIGNAL_ANALOG having an amplitude indicative of fuel level.

Figure 4:
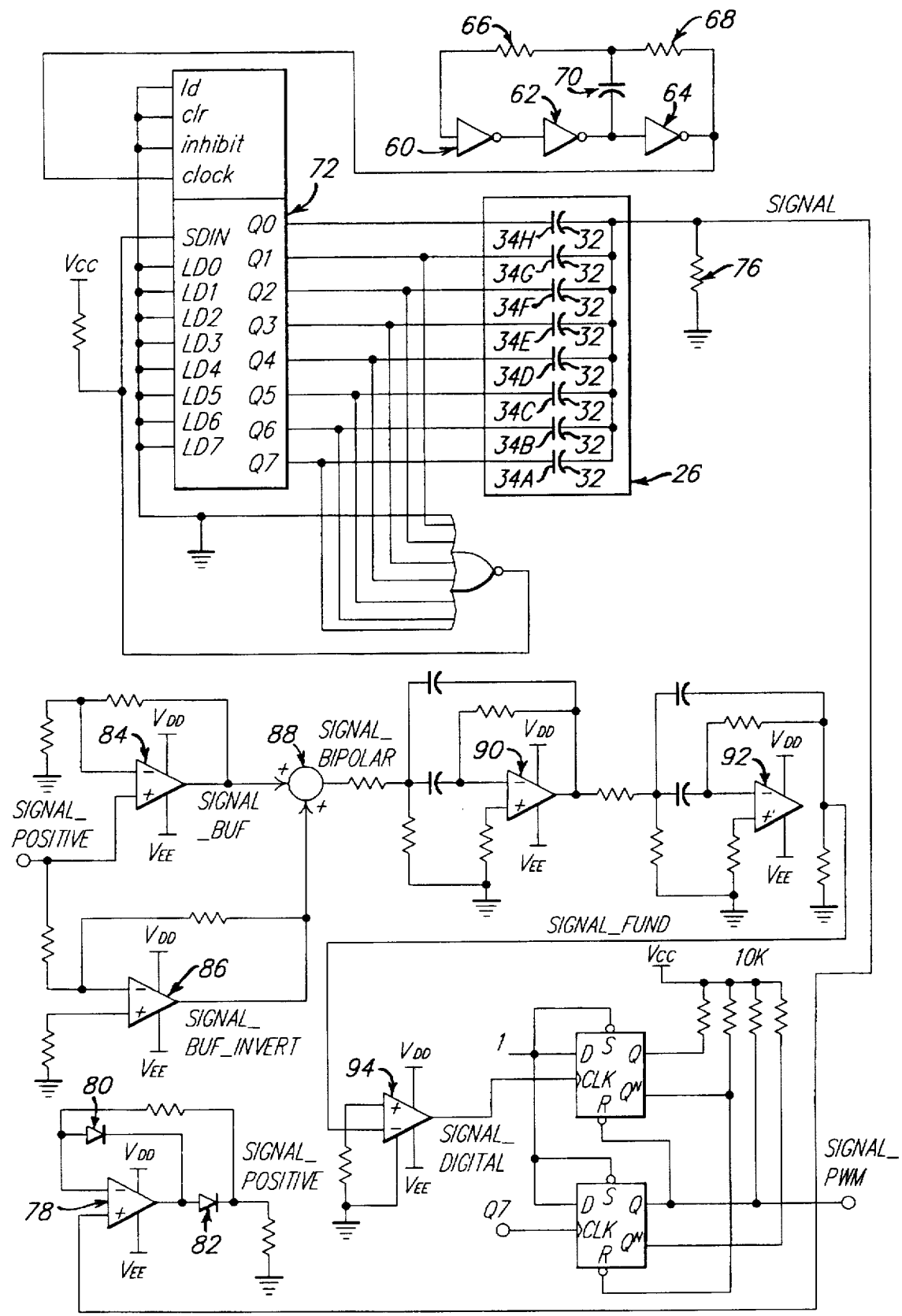
FIG. 4 illustrates an example of electrical circuitry which can perform the fluid-level-sensing method of FIG. 2.

Refer now to FIG. 4 for one example of circuitry which can perform the functions detailed in FIG. 2. Inverters 60, 62 and 64, resistors 66 and 68 and capacitor 70 form an oscillator which provides a clock signal to shift register 72. Outputs $Q_0$ to $Q_7$ of shift register 72 are coupled to segments 34A to 34H of sensor 26. Segments 34A to 34H are thus sequentially energized with the signals shown in FIG. 3A. Common electrode 32 of sensor 26 is coupled to resistor 76 and operational amplifier 78. Via operational amplifier 78 and diodes 80 and 82, the negative-going spikes 54 (FIG. 3B) of signal SIGNAL are removed to leave SIGNAL_POSITIVE.

SIGNAL_POSITIVE is then provided to operational amplifier 84, configured as a non-inverting amplifier, and operational amplifier 86, configured as an inverting amplifier. The outputs of operational amplifiers 84 and 86 are then combined to generate SIGNAL_BIPOLAR. This combining function is illustrated in FIG. 4 as summing block 88.

Operational amplifiers 90 and 92 together are configured as a band-pass filter to generate SIGNAL_FUND (FIG. 3D). Comparator 94 is configured as a zero-crossing detector whose output signal SIGNAL_DIGITAL is converted to SIGNAL_PWM by "D"-type flip-flops 96 and 98.

Several observations about fluid level sensor 26 can be made here. First, if fluid level sensor 26 is used in a fluid with significant conductivity, common electrode 32 and segments 34 should preferably be electrically insulated from the fluid with, for example, a suitable coating. Second, the physical construction of sensor 26 can vary widely. For example, plate 28 can be the inside wall of a gasoline tank, with plate 30 substantially parallel to plate 28 and spaced a suitable distance therefrom. Third, fluid level sensor 26 is preferably constructed and disposed such that the lowest segment (segment 34A in FIG. 1) is always immersed in the fluid, while the highest segment (segment 34H in FIG. 1) is always out of the fluid. Capacitance changes which cause the various spikes in FIG. 3B are thus most reliably measured. Finally, segments 34 need not be the same height, but they are preferably of the same area. For a given spacing between plates 28 and 30, therefore, two adjacent segments 34 each immersed in fluid or each exposed to air will form with common electrode 32 capacitors with equal capacitance.

From the discussion to this point, one can see that the system disclosed herein measures fluid level without knowledge of the particular composition of the fluid. That is, the location of capacitance changes within fluid level sensor 26, as measured by the relative timing of those capacitance changes with respect to the pulse train which energizes sensor 26, are detected. As long as the changes are large enough to provide reasonable signal-to-noise ratio, the actual dielectric properties of the fluid need not be known. Furthermore, the resolution of sensor 26 is not limited by the number of segments 34 employed in sensor 26. The number of segments 34 is actually determined by the amount of liquid which can be retained in the bottom of reservoir 20 in order to keep segment 34A continually immersed and the amount of air space which can be provided to keep segment 34H continually out of the liquid.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A method for measuring fluid level using a sensor comprising a first plate having continuous electrically conductive material and a second plate having electrically conductive material disposed in segments, said electrically conductive material of said first plate in opposition to said electrically conductive material of said second plate, said method comprising:

immersing said sensor in said fluid with at least one said segment completely immersed in said fluid and at least one said segment completely out of said fluid;

sequentially energizing said segments; and detecting times of voltage transitions of a first signal at said first plate, relative to said sequential energizing of said segments, as an indication of said fluid level;

wherein said step of detecting times of voltage transitions further comprises eliminating negative-going portions of said first signal to create a positive signal; and wherein said step of detecting times of voltage transitions further comprises inverting said positive signal to create an inverted signal and combining said inverted signal and said first signal to create a bipolar signal.

2. A method as recited in claim 1, wherein said step of detecting times of voltage transitions further comprises filtering said bipolar signal to extract a fundamental frequency component of said bipolar signal.

3. A method as recited of claim 2, wherein said step of detecting times of voltage transitions further comprises detecting the phase of said fundamental frequency component.

4. A method as recited in claim 3, further comprising generating a pulse-width-modulated signal having a duty cycle representative of said time.

5. A method as recited in claim 4, further comprising low-pass filtering said pulse-width-modulated signal to generate an analog signal having an amplitude representative of said time.

6. A method as recited in claim 1, further comprising generating a pulse-width-modulated signal having a duty cycle representative of said time.

7. A method as recited in claim 6, further comprising low-pass filtering said pulse-width-modulated signal to generate an analog signal having an amplitude representative of said time.

8. A fluid level sensing system comprising:

a sensor further comprising a first plate having continuous electrically conductive material and a second plate having electrically conductive material disposed in segments, said electrically conductive material of said first plate in opposition to said electrically conductive material of said second plate, said sensor immersed in said fluid with one said segment completely immersed in said fluid and one said segment completely out of said fluid;

means for sequentially energizing said segments; and means for detecting times of voltage transitions of a first signal at said first plate, relative to said sequential energizing of said segments, as an indication of said fluid level;

wherein said means for detecting times of voltage transitions further comprises means for eliminating negative-going portions of said first signal to create a positive signal; and wherein said means for detecting times of voltage transitions further comprises means for inverting said positive signal to create an inverted signal and means for combining said inverted signal and said first signal to create a bipolar signal.

9. An apparatus as recited in claim 8, wherein said means for detecting times of voltage transitions further comprises means for filtering said bipolar signal to extract a fundamental frequency component of said bipolar signal.

10. An apparatus as recited in claim 9, wherein said means for detecting times of voltage transitions further comprises means for detecting the phase of said fundamental component.

11. An apparatus as recited in claim 10, further comprising means for generating a pulse-width-modulated signal having a duty cycle representative of said time.

12. An apparatus as recited in claim 11, further comprising means for low-pass filtering said pulse-width-modulated signal to generate an analog signal having an amplitude representative of said time.

13. An apparatus as recited in claim 8, further comprising means for generating a pulse-width-modulated signal having a duty cycle representative of said time.

14. An apparatus as recited in claim 13, further comprising means for low-pass filtering said pulse-width-modulated signal to generate an analog signal having an amplitude representative of said time.

* * * * *